US010620902B2

(12) United States Patent
Ashbrook et al.

(10) Patent No.: US 10,620,902 B2
(45) Date of Patent: Apr. 14, 2020

(54) METHOD AND APPARATUS FOR PROVIDING AN INDICATION REGARDING CONTENT PRESENTED TO ANOTHER USER

(71) Applicant: Nokia Technologies Oy, Espoo (FI)

(72) Inventors: Daniel Ashbrook, Sunnyvale, CA (US); David Nguyen, Sunnyvale, CA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 652 days.

(21) Appl. No.: 13/631,596

(22) Filed: Sep. 28, 2012

(65) Prior Publication Data

US 2014/0091984 A1     Apr. 3, 2014

(51) Int. Cl.
*G06F 3/14* (2006.01)
*G02B 27/01* (2006.01)
*G06Q 10/10* (2012.01)

(52) U.S. Cl.
CPC ......... *G06F 3/1462* (2013.01); *G06Q 10/101* (2013.01); *G02B 27/017* (2013.01)

(58) Field of Classification Search
CPC ....... G06F 3/1454; G06F 3/1462; H04N 7/14; G02B 27/017
See application file for complete search history.

(56) References Cited

U.S. PATENT DOCUMENTS

| | | | |
|---|---|---|---|
| 6,388,654 B1 * | 5/2002 | Platzker | G06F 3/033 345/1.2 |
| 6,686,933 B1 * | 2/2004 | Tang | G06F 3/04855 345/2.2 |
| 7,532,230 B2 | 5/2009 | Culbertson et al. | |
| 8,239,453 B2 * | 8/2012 | Stevens | H04L 12/1827 709/204 |
| 8,655,389 B1 * | 2/2014 | Jackson | H04L 67/18 455/414.1 |
| 8,743,145 B1 * | 6/2014 | Price | G06T 19/006 345/633 |

(Continued)

FOREIGN PATENT DOCUMENTS

| | | |
|---|---|---|
| EP | 1 435 737 A1 | 7/2004 |
| WO | WO 2007/055943 A2 | 5/2007 |

(Continued)

OTHER PUBLICATIONS

Siegl, H. et al., *An augmented reality human—computer interface for object localization in a cognitive vision system*, Image and Vision Computing 25 (2007) 1895-1903.

(Continued)

*Primary Examiner* — Nitin Patel
*Assistant Examiner* — Robert M Stone
(74) *Attorney, Agent, or Firm* — Alston & Bird LLP (57) ABSTRACT

A method, apparatus and computer program product provide an indication to a first user as to the content presented to another user by the head mounted display of the other user. In the context of a method, information is received relating to content presented to a second user by a head mounted display of the second user. Based upon the information, the method also includes causing, with a processor, an indication to be presented to a first user identifying the content presented to the second user by the head mounted display of the second user.

12 Claims, 5 Drawing Sheets

(56) References Cited

U.S. PATENT DOCUMENTS

| | | | |
|---|---|---|---|
| 8,832,233 B1* | 9/2014 | Brin | H04L 29/06476 709/203 |
| 8,869,292 B2* | 10/2014 | Eluard | G09C 5/00 380/259 |
| 9,058,813 B1* | 6/2015 | Blanksteen | G10L 15/19 |
| 9,097,891 B2* | 8/2015 | Border | G02B 27/0093 |
| 9,310,883 B2* | 4/2016 | Weising | G09G 5/08 |
| 9,498,720 B2* | 11/2016 | Geisner | A63F 13/216 |
| 9,519,640 B2* | 12/2016 | Perez | G02B 27/017 |
| 2004/0189675 A1* | 9/2004 | Pretlove et al. | 345/633 |
| 2006/0170652 A1* | 8/2006 | Bannai et al. | 345/156 |
| 2006/0284791 A1 | 12/2006 | Chen et al. | |
| 2008/0022408 A1* | 1/2008 | Phelps | G06Q 10/10 726/26 |
| 2008/0159601 A1* | 7/2008 | Alberth | B29D 11/00826 382/118 |
| 2009/0003662 A1* | 1/2009 | Joseph | H04N 1/0045 382/118 |
| 2009/0097710 A1* | 4/2009 | Sroka | G06T 15/20 382/103 |
| 2009/0249244 A1* | 10/2009 | Robinson | G06F 3/0481 715/781 |
| 2010/0085462 A1* | 4/2010 | Sako et al. | 348/333.01 |
| 2010/0245563 A1* | 9/2010 | Golovchinsky | H04N 7/18 348/135 |
| 2011/0206285 A1* | 8/2011 | Hodge | G06F 21/84 382/224 |
| 2011/0221793 A1* | 9/2011 | King, III | G02B 27/017 345/690 |
| 2011/0321137 A1* | 12/2011 | Iida | G06F 21/10 726/4 |
| 2012/0054838 A1* | 3/2012 | Kim | H04L 63/10 726/4 |
| 2012/0102118 A1* | 4/2012 | Arms | G06F 9/542 709/205 |
| 2012/0105473 A1* | 5/2012 | Bar-Zeev | G02B 27/017 345/633 |
| 2012/0212509 A1* | 8/2012 | Benko | G03B 35/00 345/633 |
| 2012/0299915 A1* | 11/2012 | Eluard | G09C 5/00 345/420 |
| 2012/0299962 A1* | 11/2012 | White | G02B 27/017 345/633 |
| 2013/0007895 A1* | 1/2013 | Brolley | G06F 21/62 726/28 |
| 2013/0041889 A1* | 2/2013 | Gotoh | H04L 67/02 707/722 |
| 2013/0050274 A1* | 2/2013 | Yamada | G09G 5/14 345/671 |
| 2013/0083011 A1* | 4/2013 | Geisner | G09G 5/00 345/419 |
| 2013/0141419 A1* | 6/2013 | Mount | G06F 3/011 345/419 |
| 2013/0169682 A1* | 7/2013 | Novak | G02B 27/017 345/633 |
| 2013/0275401 A1* | 10/2013 | Auger | G06F 21/10 707/704 |
| 2013/0286223 A1* | 10/2013 | Latta | H04N 1/00347 348/207.1 |
| 2013/0293468 A1* | 11/2013 | Perez et al. | 345/158 |
| 2015/0153571 A1* | 6/2015 | Ballard | H04W 76/10 345/8 |

FOREIGN PATENT DOCUMENTS

| | | |
|---|---|---|
| WO | WO 2011/136784 A1 | 11/2011 |
| WO | WO2013028813 * | 2/2013 |

OTHER PUBLICATIONS

Szalavari, Z. et al., "*Studierstube*": *An Environment for Collaboration in Augmented Reality*, Virtual Reality, vol. 3, No. 1 (Jan. 1998) 37-48.

Collaboration immersive workspace through a shared augmented environment [online] [retrieved Jan. 9, 2014]. Retrieved from the Internet: <URL: http://citeseerx.ist.psu.edu/viewdoc/download?doi=10.1.1.20.1003&rep=rep1&type=pdf>. (undated) 12 pages.

Evaluation of Mixed-Space Collaboration [online] [retrieved Jan. 9, 2014]. Retrieved from the Internet: <URL: http://www.eden.net.nz/phil/research/Grasset%20Lamb%20Billinghurst%202005.pdf (undated) 10 pages.

Designing Immersive Virtual Reality for Geometry Education [online] [retrieved Jan. 9, 2014]. Retrieved from the Internet: <URL: http://www.icg.tu-graz.ac.at/Members/schmalstieg/Publications/c3d-vr2006-final.pdf/download>. (undated) 8 pages Collaboration in Augmented Reality: How to establish coordination and joint attention? . . . [online] [retrieved Jan. 9, 2014]. Retrieved from the Internet: <URL: http://link.springer.com/chapter/10.1007%2F978-0-85729-913-0_22> (Sep. 2001), 9 pages.

Marker Tracking and HMD Calibration for a Video-based Augmented Reality Conferencing System [online] [retrieved Jan. 9, 2014], Retrieved from the Internet: <URL: http://www.hitl.washington.edu/artoolkit/Papers/IWAR99.kato.pdf>. (undated) 10 pages.

International Search Report and Written Opinion for Application No. PCT/FI2013/050887 dated Dec. 10, 2013.

Examination Report of the European Patent Application No. 13776838.8 dated Nov. 19, 2019, 5 pages.

* cited by examiner

METHOD AND APPARATUS FOR PROVIDING AN INDICATION REGARDING CONTENT PRESENTED TO ANOTHER USER

TECHNOLOGICAL FIELD

An example embodiment of the present invention relates generally to content presented upon a head mounted display and, more particularly, to the provision of an indication relating to the content presented to another user by the head mounted display of the other user.

BACKGROUND

Multiple participants frequently collaborate on projects. During such collaboration, the participants may review a variety of content, such as documents, drawings, spreadsheets, electronic mail messages or the like. In one common scenario, one of the participants may present the content on a display, such as a computer monitor, while the other participants gather around the computer monitor so as to concurrently review the same content. As a result of the sharing of the content, such as may be presented by the computer monitor of one of the participants, each of the participants may have a relatively common frame of reference and may be aware that the other participants have reviewed the same content. The collaboration between the participants may therefore be facilitated by making reference to portions of the content that have been reviewed by the participants.

In contrast to the presentation of content upon a computer monitor that may be shared in a public manner, content may be reviewed by a user in a private manner. For example, a user may wear a head mounted display upon which content may be presented. While a head mounted display may facilitate the review of the content by a first user who wears the head mounted display, it is generally quite difficult, if not impossible, for other participants to view the content presented by the head mounted display of the first user. Thus, the first user who wears a head mounted display on which content is presented may have some difficulty in collaborating with other participants since the other participants may not be able to readily determine the content that is currently being reviewed by the first user who wears the head mounted display. As such, the participants may not be able to make reference to particular portions of the content during their collaboration and be confident that all of the other participants are concurrently reviewing the same content.

BRIEF SUMMARY

A method, apparatus and computer program product are provided in accordance with an example embodiment in order to provide an indication to a first user as to the content presented to another user by the head mounted display of the other user. Based upon the indication, the first user may be aware of the content that is currently being reviewed by the other user. Accordingly, the method, apparatus and computer program product of an example embodiment facilitate collaboration between the users by increasing the awareness of the first user as to the content that has been reviewed or is currently being reviewed by the second user, even in instances in which the content itself remains private relative to others in proximity to the second user.

In at least one embodiment, a method is provided that includes receiving information relating to content presented to a second user by a head mounted display of the second user. Based upon the information, the method also includes causing, with a processor, an indication to be presented to a first user identifying the content presented to the second user by the head mounted display of the second user.

The method of at least one embodiment may also include causing content to be presented to the first user by a head mounted display of the first user. The method of this embodiment may also compare the information relating to content presented to the second user with information relating to content presented to the first user. The indication that is caused to be presented to the first user may be based upon the comparison. In at least one embodiment, the indication that is caused to be presented to the first user may provide information regarding whether the content presented to the second user is identical to the content presented to the first user.

The method of at least one embodiment may cause the indication to be presented to the first user by causing a representation of the content presented to the second user to be presented to the first user. In this embodiment, the method may also generate the representation of the content presented to the second user. For example, the representation of the content may include an abstraction of the content presented to the second user. In at least one embodiment, the method may generate the representation of the content presented to the second user by obscuring at least portions of the content presented to the second user.

The method of at least one embodiment may cause the indication to be presented to the first user by causing the indication to be presented to the first user by a head mounted display of the first user such that the indication is presented at a location defined in relation to the second user. In this regard, the method may cause the indication to be presented to the first user by causing the indication to be presented to the first user by the head mounted display of the first user such that the indication appears to be superimposed upon at least one of the second user or an object associated with the second user. Alternatively, the method may cause the indication to be presented to the first user by causing the indication to be presented to the first user by the head mounted display of the first user such that the indication appears to be proximate to the second user.

In another embodiment, an apparatus is provided that includes at least one processor and at least one memory including computer program code with the at least one memory and the computer program code configured to, with the processor, cause the apparatus to at least receive information relating to content presented to a second user by a head mounted display of the second user. Based upon the information, the at least one memory and the computer program code are also configured to, with the processor, cause the apparatus to cause an indication to be presented to a first user identifying the content presented to the second user by the head mounted display of the second user.

The at least one memory and the computer program code may also be configured to, with the processor, cause the apparatus of at least one embodiment to cause content to be presented to the first user by a head mounted display of the first user. The at least one memory and the computer program code may also be configured to, with the processor, cause the apparatus of this embodiment to compare the information relating to content presented to the second user with information relating to content presented to the first user. The indication that is caused to be presented to the first user may be based upon the comparison. In at least one embodiment, the indication that is caused to be presented to the first user may provide information regarding whether the content presented to the second user is identical to the content presented to the first user.

The at least one memory and the computer program code may be configured to, with the processor, cause the apparatus of at least one embodiment to cause the indication to be presented to the first user by causing a representation of the content presented to the second user to be presented to the first user. In this embodiment, the at least one memory and the computer program code may also be configured to, with the processor, cause the apparatus to generate the representation of the content presented to the second user. For example, the representation of the content may include an abstraction of the content presented to the second user. In at least one embodiment, the at least one memory and the computer program code may be configured to, with the processor, cause the apparatus to generate the representation of the content presented to the second user by obscuring at least portions of the content presented to the second user.

In a further embodiment, a computer program product is provided that includes at least one non-transitory computer-readable storage medium having computer-executable program code portions stored therein with the computer-executable program code portions including program code instructions for receiving information relating to content presented to a second user by a head mounted display of the second user. Based upon the information, the computer-executable program code portions also include program code instructions for causing an indication to be presented to a first user identifying the content presented to the second user by the head mounted display of the second user.

The computer-executable program code portions of at least one embodiment may also include program instructions for causing content to be presented to the first user by a head mounted display of the first user. The computer-executable program code portions of this embodiment may also include program instructions for comparing the information relating to content presented to the second user with information relating to content presented to the first user. The indication that is caused to be presented to the first user may be based upon the comparison. In at least one embodiment, the indication that is caused to be presented to the first user may provide information regarding whether the content presented to the second user is identical to the content presented to the first user.

The computer-executable program code portions of at least one embodiment may also include program instructions for generating a representation of the content presented to the second user. In this embodiment, the program code instructions for causing the indication to be presented to the first user may include program code instructions for causing a representation of the content presented to the second user to be presented to the first user. The representation of the content may include an abstraction of the content presented to the second user. In at least one embodiment, the program instructions for generating the representation may include program code instructions for obscuring at least portions of the content presented to the second user.

In yet another embodiment, an apparatus is provided that includes means for receiving information relating to content presented to a second user by a head mounted display of the second user. Based upon the information, the apparatus also includes means for causing an indication to be presented to a first user identifying the content presented to the second user by the head mounted display of the second user.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with at least one embodiment of the present invention in order to provide an indication to a first user relating to the content presented to a second user by the head mounted display worn by the second user. Based upon the indication that is presented to the first user, such as by the head mounted display of the first user, relating to the content presented to the second user by the head mounted display of the second user, collaboration between the first and second users may be facilitated since the first user will be aware of the content that has been reviewed by the second user including the content that is currently being reviewed by the second user. Consequently, the first and second users need not review the same content on the same computer monitor in order to be aware of the content that has been or is currently being reviewed by the other user and, instead, the method, apparatus and computer program product of an example embodiment provide a mechanism for determining the content that is being presented to another user, while, in at least one embodiment, permitting the content to remain private or to at least to limit disclosure of the content.

Figure 1:
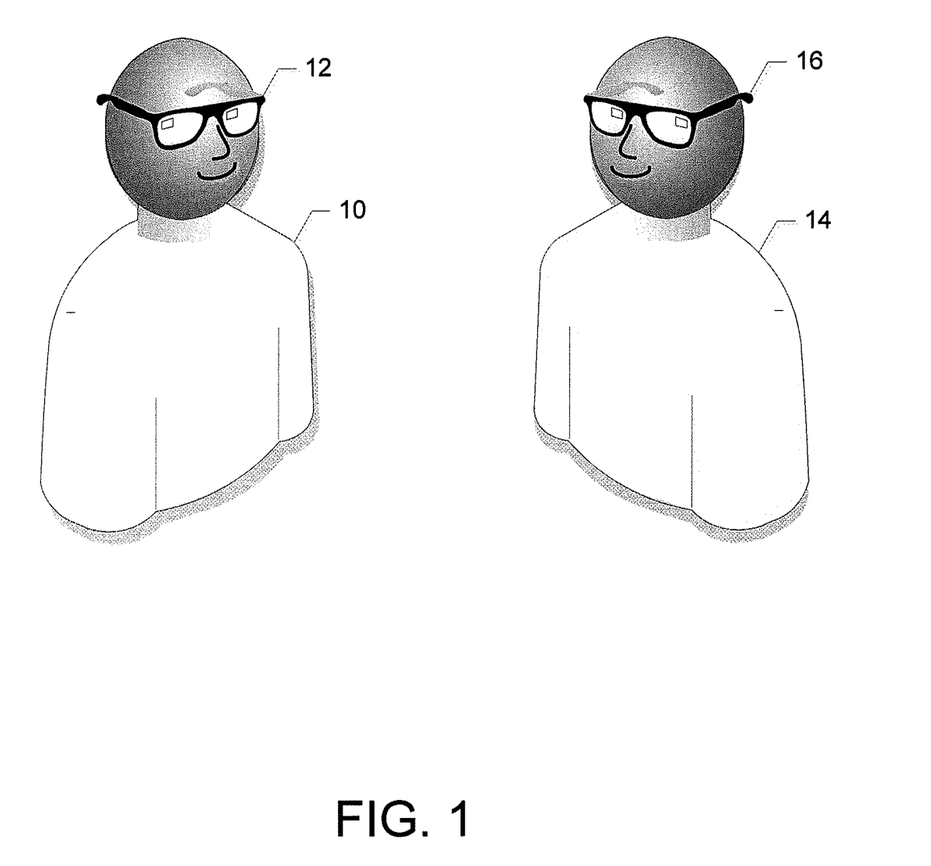
FIG. 1 is a perspective view illustrating first and second users wearing respective head mounted displays.

Referring now to FIG. 1, first and second users 10, 14 are illustrated. The users may be collaborating with one another on a project or the first user may simply have an interest in the content being reviewed by the second user, even in the absence of collaboration therebetween. As shown in FIG. 1, each of the first and second users wears a head mounted display 12, 16. A head mounted display permits a user to optically view a scene external to the head mounted display. With reference to FIG. 1 by way of example, a head mounted display may be in the form of a pair of glasses having a pair of lenses and a pair of side stems configured to support the glasses upon the user's ears. The glasses may be worn by the user such that the user may view a scene, e.g., a field of view, through the lenses of the glasses. However, the glasses may also be configured to present a visual representation of other information so as to augment or supplement the user's view of the scene through the lenses of the glasses. The information presented by the head mounted display may augment the objects in the scene viewed through the head mounted display, such as by identifying or otherwise providing more information regarding one or more of the objects viewed through the head mounted display. Alternatively, the information presented by the head mounted display may be unrelated to the objects in the scene viewed through the head mounted display, but may otherwise provide information that may be of interest to the user, such as content that may be relevant to a project on which the first and second users are collaborating. Regardless of the type of information presented by the head mounted display, a head mounted display as exemplified by the glasses may support augmented reality and other applications.

While augmented reality glasses are one example of a head mounted display 12, 16, a head mounted display may be embodied in a number of different manners with a variety of form factors, each of which may permit a user to optically see through the display so as to view the user's surroundings and each of which may benefit from the method, apparatus and computer program product of an example embodiment of the present invention as described below. For example, the head mounted display may be in the form of a head mounted visor or a helmet manner display. For example, the head mounted display may be in a form of a helmet worn by a motorcyclist, a pilot or they like.

The content presented to a user by a respective head mounted display is generally difficult, if not impossible, to be view by another user. For example, content presented by the head mounted display 16 of the second user 14 may be difficult, if not impossible, for the first user 10 to see. However, the method, apparatus and computer program product of an example embodiment of the present invention facilitates the provision of an indication to the first user of the content presented to the second user by the head mounted display of the second user. In this regard, an apparatus 20 may be provided and may be specifically configured in accordance with an example embodiment of the present invention. In accordance with an example embodiment of the present invention, the apparatus may be associated with the head mounted display 12 of the first user in order to receive information regarding the content presented by the head mounted display of the second user and to provide an indication to the first user identifying the content presented by the head mounted display of the second user. In at least one embodiment, the apparatus may be embodied by the head mounted display of the first user. Alternatively, the apparatus may be embodied by a computing device that is remote from the head mounted display of the first user, but that is in communication therewith, such as via wireless communication, e.g., via Bluetooth communication, Wi-Fi or another wireless network, or via wired communication. For example, a computing device, such as a personal digital assistant (PDA), mobile telephone, smartphone, pager, mobile television, gaming device, laptop computer, camera, tablet computer, touch surface, video recorder, audio/video player, radio, electronic book, positioning device (e.g., global positioning system (GPS) device), or any combination of the aforementioned, and other types of voice and text communications systems, may embody the apparatus of at least one embodiment and be in communication with the head mounted displays of the first and second users. In this embodiment, the computing device that embodies the apparatus may then provide direction to another computing device, such as the head mounted display of the first user, to direct the presentation of an indication of the content presented by the head mounted display of the second user.

Figure 2:
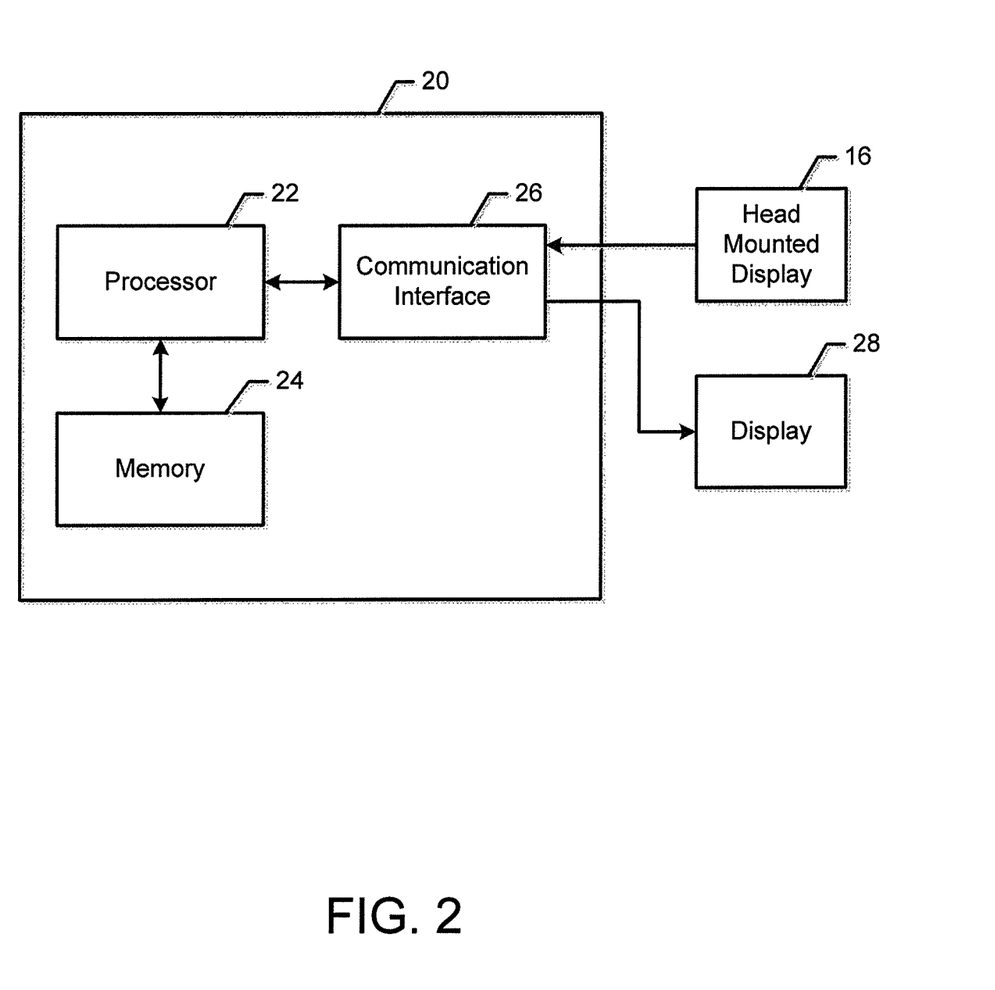
FIG. 2 is a block diagram of an apparatus that may be specifically configured in accordance with an example embodiment of the present invention.

Regardless of its implementation, the apparatus 20 may include or otherwise be in communication with a processor 22, a memory device 24 and a communication interface 26. It should be noted that while FIG. 2 illustrates one example of a configuration of an apparatus that may be specifically configured in accordance with an embodiment of the present invention, numerous other configurations may also be used to implement other embodiments. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device, such as a head mounted display 12 of the first user 10 or a computing device in communication with the head mounted display of the first user, configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

Meanwhile, the communication interface 26 may be any means such as a device or circuitry embodied in either hardware or a combination of hardware and software that is configured to receive and/or transmit data from/to a head mounted display 12 of the first user 10, such as a computing device embodied by the head mounted display of the first user, in an embodiment in which the apparatus 20 is remote from the head mounted display. As shown in FIG. 2, the communication interface may also be configured to communicate with the head mounted display 16 of the second user 14, such as via wireless communication, e.g., Bluetooth, Wi-Fi or another wireless network, or via wireline. As a further example, the head mounted display of the first user may include a display 28 and the communication interface may be configured to direct the presentation of information upon the display. Additionally, the communication interface may be configured to communicate with other components of the computing device in an instance in which the apparatus is embodied by a computing device embodied by the head mounted display of the first user or with a remote computing device in an instance in which the apparatus is separate from the head mounted display of the first user.

In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the sensor(s) 18, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device including, for example, other components of the head mounted display 12 of the first user 10 in an embodiment in which the apparatus 20 is embodied by the head mounted display of the first user.

Figure 3:
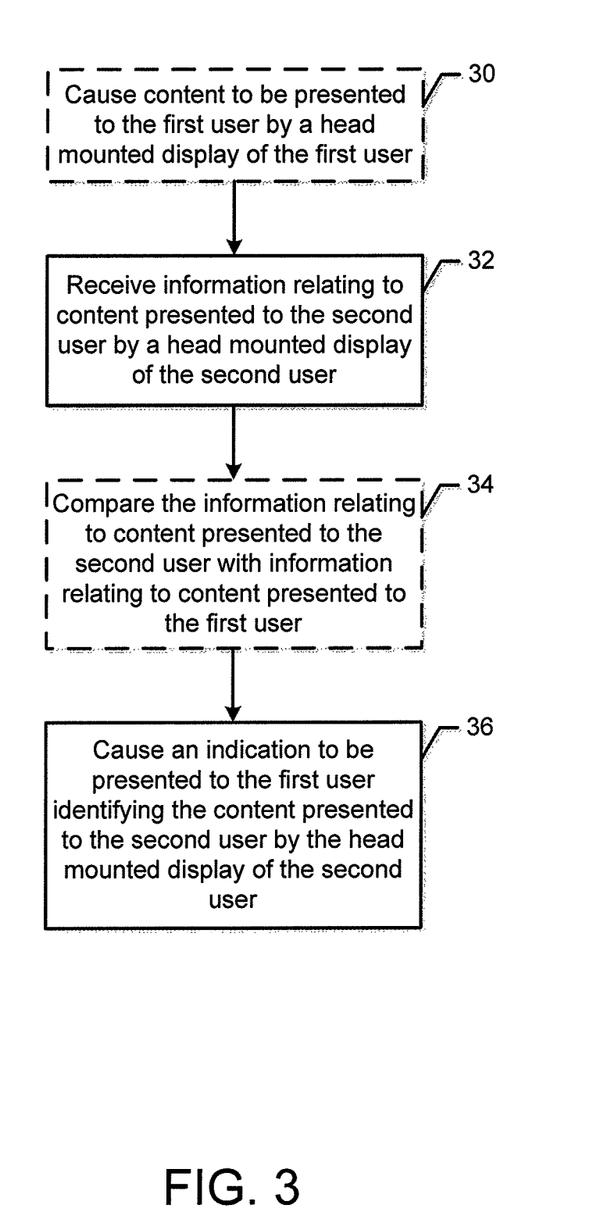
FIG. 3 is a flow chart illustrating operations performed, such as by the apparatus of FIG. 2, in accordance with an example embodiment of the present invention.

Referring now to FIG. 3, the operations performed, such as by the apparatus 20 of FIG. 2, in accordance with an example embodiment of the present invention are illustrated. In this regard, content may be presented to the second user 12 by the head mounted display 16 of the second user, such as by causing the display of content on the head mounted display of the second user. The content may be presented by the head mounted display of the second user such that the content appears in the field of view of the second user and appears to float within the field of view of the second user. Alternatively, the content may be presented by the head mounted display of the second user so as to be associated with and positionally fixed to an object within the field of view of the second user, such as a table or a wall. Once the content is presented by the head mounted display of the second user, the second user may readily view the content while concurrently viewing their surroundings. However, the first user 10 may be unable to view the content presented by the head mounted display of the second user, at least not clearly.

As shown in FIG. 3, however, an apparatus 20 of at least one embodiment may be configured to receive information relating to the content presented to the second user 12 by the head mounted display 16 of the second user. See block 32. In this regard, the head mounted display of the second user or a computing device associated with the head mounted display of the second user may be configured to transmit information relating to the content presented to the second user by the head mounted display of the second user. The apparatus therefore includes means, such as the processor 22, the communication interface 26 or the like, for receiving the information relating to content presented to the second user by the head mounted display of the second user.

Various types of information relating to the content that is presented by the head mounted display 16 of the second user 12 may be provided and, in turn, received by the apparatus 20. For example, the information may be the actual content or an abstraction of the content. In regards to the abstraction of the content, a summary of the content or a blurred representation may be received instead of the actual content itself. As another example, the abstraction of the content that is received may include only the title of the content, such as the name of a document, the subject of an electronic mail message or the like, or certain predefined field(s) of the content instead of the content itself. As yet another example, the abstraction of the content may include metadata associated with the content instead of the content itself. In an instance in which the content is an image that is presented to the second user by the head mounted display of the second user, the image may be provided to and received by the apparatus or an abstraction of the image, such as an image in which the color of the pixels have been averaged or otherwise modified, may be provided and received by the apparatus. In an instance in which the content is moving, such as a movie or an animation, the abstraction of the content may be, for example, a pulsing light with the pulsations synchronized with the content.

Referring now to block 36 of FIG. 3, the apparatus 20 may be configured to cause an indication 40 to be presented to the first user 10 relating to the content presented to the second user 12 by the head mounted display 16 of the second user. See, for example, FIGS. 4 and 5. In at least one embodiment, the indication that is presented to the first user identifying the content presented to the second user by the head mounted display of the second user is presented to the first user by the head mounted display 14 of the first user. Thus, the apparatus may include means, such as the processor 22, the communication interface 26 or the like, for causing an indication to be presented to the first user relating to the content presented by the head mounted display of the second user, such as by sending instructions to the display 28 of the head mounted display worn by the first user.

As described below, the apparatus 20, such as the processor 22, the communication interface 26 or the like, may be configured to cause various types of indications 40 to be presented to the first user 10 via the head mounted display 14 of the first user. For example, the indication may be the content itself. Alternatively, the indication may be a representation of the content which provides information regarding the content without disclosing the content itself. For example, the representation of the content may be an abstraction of the content as described above. In this regard, the abstraction may be provided by the head mounted display 16 of the second user 12 as described above or may be generated by the apparatus, such as the processor, following receipt of the content itself from the head mounted display 16 of the second user 12.

The apparatus 20, such as the processor 22, the communication interface 26 or the like, may be configured to cause the indication 40 to be presented to the first user 10 by the head mounted display 14 of the first user such that the indication is presented at a location that is defined in relation the second user 12, such as at a predefined position relative to the second user. As such, the first user may view the second user within the field of view seen through the head mounted display worn by the first user. At a location that is defined in relation to the second user, the indication may be presented by the head mounted display of the first user such that the first user is able to see both the second user and the indication identifying the content presented to the second user by the head mounted display of the second user.

In regards to the presentation of the indication 40 at a location defined in relation to the second user 12, the apparatus 20, such as the processor 22, the communication interface 26 or the like, of at least one embodiment may be configured to cause the indication to be presented to the first user 10 by the head mounted display 14 of the first user such that the indication appears to be superimposed upon the second user and/or an object associated with the second user. By being superimposed upon the second user and/or an object associated with a second user, the apparatus, such as the processor, the communication interface or the like, causes the indication to be presented in a manner that at least partially overlays the second user and/or an object associated with the second user. In some embodiments, the indication that is superimposed upon the second user and/or an object associated with the second user is translucent such that the portion of the second user and/or the portion of the object associated with the second user that is overlaid by the indication can be seen through the indication. In other embodiments, the indication that is superimposed upon the second user and/or an object associated with the second user may be opaque such that the portion of the second user and/or the portion of the object associated with the second user that underlies the indication is not visible.

In at least one embodiment, the apparatus 20, such as the processor 22, may be configured to cause the indication 40 to be superimposed upon the same portion of the second user 12 and/or the same portion of an object associated with the second user even as there is relative movement between the head mounted display 14 of the first user 10 and the second user, such as may be attributable to the user moving within the field of view of the first user and/or as the head of the first user and, therefore, the head mounted display worn by the first user is moved relative to the second user. In this embodiment, the apparatus, such as the processor, may be configured to track the location of the portion of the second user and/or the portion of an object associated with the second user upon which the indication is to be superimposed. In this regard, an image of the field of view of the first user through the head mounted display of the first user may be captured, such as by a camera incorporated within or associated with the head mounted display of the first user. The apparatus, such as the processor, may be configured to analyze the image and to determine the location within the field of view of the head mounted display of the first user of the portion of the second user and/or the portion of the object associated with the second user upon which the indication is to be superimposed. The apparatus, such as the processor, may thereafter cause the indication to be superimposed upon the location of the portion of the second user and/or the portion of the object associated with the second user that was determined from the analysis of the image, such as by sending instructions to the display 28 of the head mounted display worn by the first user. By repeating this process of image capture and analysis, the apparatus, such as the processor, may cause the indication to be superimposed upon the same portion of the second user and/or the same portion of an object associated with the second user even as there is relative movement between the head mounted display of the first user and the second user.

Figure 4:
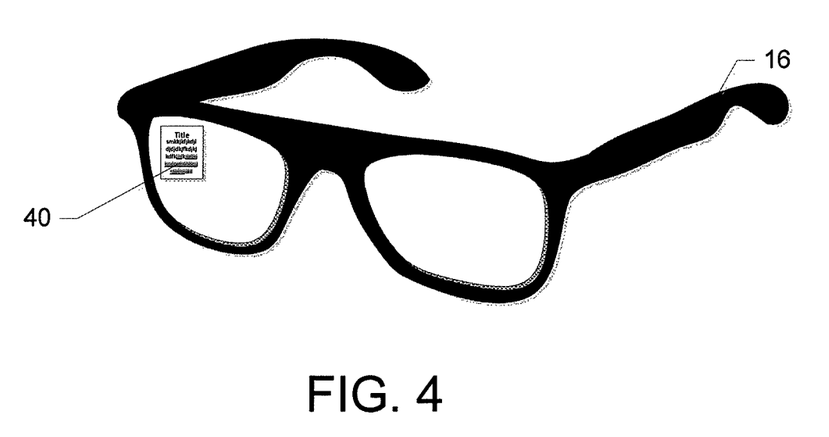
FIG. 4 is a perspective view of the head mounted display of the second user in which an indication of the content presented to the second user is presented to the first user in a manner in which the indication is superimposed upon the head mounted display of the second user in accordance with an example embodiment of the present invention.

Various objects may be associated with the second user 12. For example, objects that are worn or carried by the second user may be considered to be associated with the second user. In this regard, clothing worn by the user or a hat worn by the user may be considered to be associated with the second user. Additionally, the head mounted display 16, such as a pair of augmented reality glasses, may be considered to be associated with the second user. As such, the apparatus 20 of at least one embodiment, such as the processor 22, the communication interface 26 or the like, may be configured to cause the indication 40 to be presented to the first user 10 by the head mounted display 14 of the first user such that the indication appears to be superimposed upon the head mounted display of the second user as shown in FIG. 4.

As an alternative approach to the presentation of the indication at a location defined in relation to the second user 12, the apparatus 20, such as the processor 22, the communication interface 26 or the like, may be configured to cause the indication to be presented to the first user 10 by the head mounted display 14 of the first user such that the indication appears to be proximate to the second user. By being proximate to the second user, the indication that is caused to be presented to the first user appears to be positioned at least partially, if not entirely, beyond the second user, such as by being spaced apart from the second user. However, the indication that is caused to be presented to the first user in this embodiment may be relatively near the second user, such as by being within a predefined distance of the second user, in order to maintain the proximal relationship between the second user and the indication.

Figure 5:
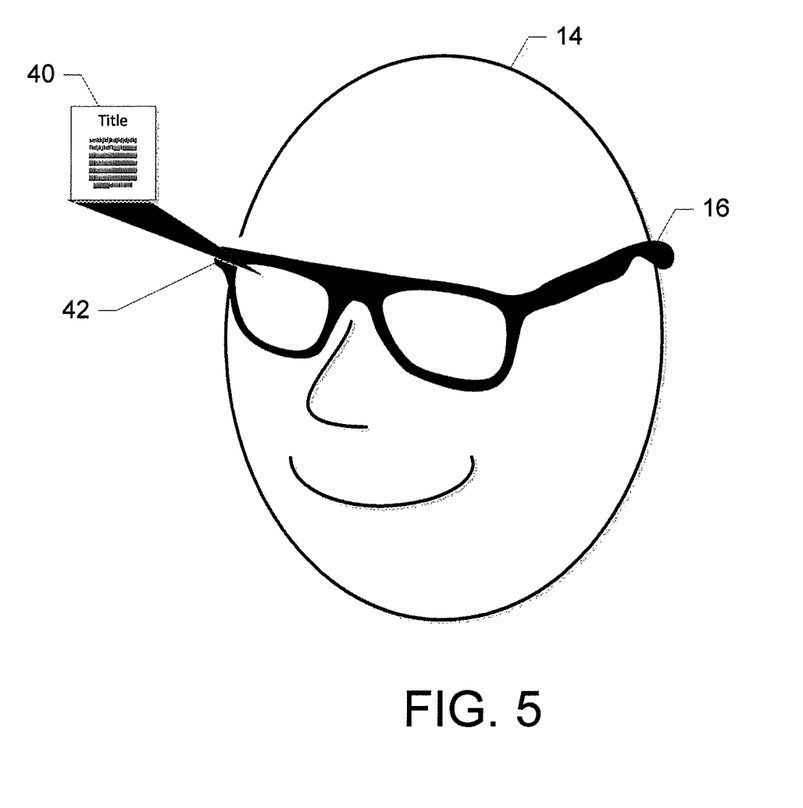
FIG. 5 is a perspective view of the second user and the head mounted display worn by the second user with an indication of the content presented to the second user being presented to the first user with the indication appearing to float proximate to the second user in accordance with an example embodiment of the present invention.

In this embodiment, the apparatus 20, such as the processor 22, the communication interface 26 or the like, may be configured to cause the indication 40 to be presented to the first user 10 by the head mounted display 14 of the first user such that the indication appears to float proximate to the second user as shown, for example, in FIG. 5. In this regard, the indication may be caused to be presented to the first user in various forms, such as a voice bubble, a thought bubble or the like. As described above, the apparatus, such as a processor, may be configured to track the position of the second user within the field of view of the first user through the head mounted display worn by the first user, such as by repeatedly capturing images of the field of view of the first user and analyzing the images to identify the position of the second user therein. As such, the apparatus, such as the processor, may be configured to cause the indication to be presented in the same relative position with respect to the second user, even as relative movement between the second user and the head mounted display of the first user occurs. As such, the indication that is presented to the first user appears to float relative to the second user.

As shown in FIG. 5, the apparatus 20, such as the processor 22, may be additionally configured to cause the indication 40 that is presented to the first user 10 by the head mounted display 14 of the first user to include a visual association 42 with the second user 12. The visual association may have various forms, such as a line, an arrow, a pointer or that like, and serves to visibly link or otherwise associate the indication with the second user and/or an object associated with the second user. As noted above, various objects may be associated with the second user including objects, e.g., a hat, clothing, etc., that are worn or carried by the second user may be considered to be associated with the second user. Additionally, the head mounted display 16, such as a pair of augmented reality glasses, may be considered to be associated with the second user. In the embodiment illustrated in FIG. 5, for example, the visual association has the form of a link that associates the indication with the second user.

As shown in block 30 of FIG. 3, the apparatus 20 of at least one embodiment may also be configured to cause content to be presented to the first user 10 by the head mounted display 14 of the first user. Thus, the apparatus may include means, such as the processor 22, the communication interface 26 or the like, for causing content to be presented via the head mounted display of the first user. In this embodiment, the first user may therefore not only see the field of view through the head mounted display including any indication that is presented relative to the second user 12, but may also see the content that is presented by the head mounted display of the first user.

In this embodiment and as shown in block 34 of FIG. 3, the apparatus 20 may be configured to compare the information relating to the content presented to the second user 12 that was received as shown, for example, in block 32 with information relating to the content presented by the first user 10 as shown in block 30. Thus, the apparatus may include means, such as the processor 22, the communication interface 26 or the like, for making such a comparison. As a result of this comparison, the apparatus, such as the processor, may determine if the same content is being concurrently presented to both the first and second users via the respective head mounted displays or whether different content is being presented to the first and second users via the respective head mounted displays.

Figure 6:
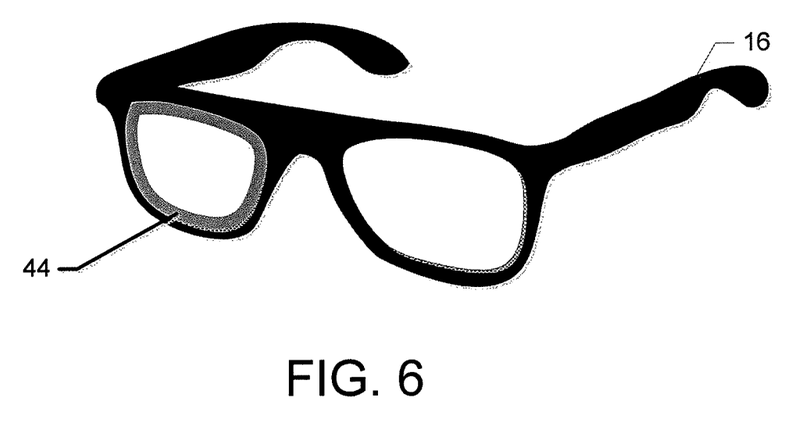
FIG. 6 is a perspective view of the head mounted display of the second user with an indication of the content presented to the second user being presented to the first user in the form of a ring about one lens of the head mounted display of the second user in accordance with an example embodiment of the present invention.

In this embodiment, the indication that is caused to be presented to the first user 10 may be based upon the comparison. For example, the indication that is caused to be presented to the first user may provide information regarding whether the content presented to the second user 12 is identical to the content presented to the first user. This indication of the commonality of the content presented to both the first and second users may be provided in various manners, but is provided in the embodiment of FIG. 6 by the presentation of an indication 44, such as by the head mounted display 14 of the first user, that appears to the first user as the illumination or coloring of a predefined region, such as ring about one of the lenses of the head mounted display 16 worn by the second user. Alternatively, this indication may be presented, such as by the head mounted display of the first user, so as to appear to the first user as a halo positioned above the head of the second user, as a star presented upon the chest of the second user or otherwise. As such, the first user may quickly determine whether the second user is reviewing the same content as the first user by determining whether the indication that is representative of the commonality of the content presented to both the first and second users is visible.

Other types of comparisons may be made in other embodiments. For example, the indication that is caused to be presented to the first user 10 may provide information regarding whether the first and second users are currently viewing different portions, e.g., different pages, of the same content. As another example, the indication that is caused to be presented to the first user may provide information regarding whether the first and second users are currently viewing different versions of same content. In a further example, the indication that is caused to be presented to the first user may provide information regarding whether the first and second users are currently viewing content that is substantially similar, such as content that deviates by no more than a predefined amount or percent.

The content that is presented to the second user 12 by the head mounted display 16 of the second user may include at least portions that are confidential, private or the like. Content may be indicated by the head mounted display of the second user to be private in various manners. For example, all content may be considered private, content that is to be considered private may be marked, content that is to be considered private may be indicated by the second user, content associated with one or more respective applications may be considered private while content associated with other applications may not be considered private, etc. The privacy of the content presented to the second user by the head mounted display of the second user may be maintained by not causing the content itself to be displayed for the first user, but, instead, causing a summary or an abstraction of the content to be presented to the first user 10 or causing a visible indication representative of the commonality of the content presented to both the first and second users to be presented to the first user.

In at least one embodiment, however, the apparatus 20, such as the processor 22, may be configured to generate a representation of the content presented to the second user 12 and, in the course of generating the representation, may obscure at least portions of the content presented to the second user. The portions of the content that are obscured may be defined in various manners including the obscuration of the content within predefined fields, the obscuration of content is predefined pattern that effectively masks the content, the obscuration of content identified by the second user or by a third party or otherwise. Following the obscuration of portions of the content that is presented to the second user, the apparatus, such as the processor, the communication interface 26 or the like, may be configured to cause the representation of the content, including those portions that have been obscured, to be presented to the first user 10 via the head mounted display 14 of the first user. As a result of the obscuration of at least portions of the content, the first user may be able to identify the content that is currently being reviewed by the second user so as to determine whether the second user is reviewing the same content as is currently being reviewed by the first user, but the privacy of the content may be maintained.

By causing an indication to be presented to the first user 10 identifying the content presented to the second user 12 by the head mounted display 16 of the second user, the first user may readily identify the content that is being reviewed by the second user and, in one instance, may determine whether the second user is reviewing the same content as is currently being reviewed by the first user. As such, the first and second users may collaborate and, in the course of such collaboration, may review the same documentation or other content as evidenced by the indications that are cause to be presented in accordance with an embodiment of the present invention.

As described above, FIG. 3 is a flowchart of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 24 of an apparatus 20 employing an embodiment of the present invention and executed by a processor 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
    causing content to be presented to a first user by a head mounted display of the first user;
    receiving information relating to content presented to a second user by a head mounted display of the second user;
    generating a representation of the content presented to the second user, wherein the representation of the content comprises an abstraction of the content presented to the second user, and wherein the abstraction of the content presented to the second user comprises a blurred representation of the content, a title of the content or one or more fields of the content;
    based upon the information, causing, with a processor, the representation of the content, including the content comprising the abstraction that is presented to the second user to also be presented to the first user by the head mounted display of the first user so as to identify the content presented to the second user by the head mounted display of the second user but without displaying the content itself;
    causing a visual indicator to be presented to the first user by the head mounted display of the first user representative of a commonality of the information relating to content presented to the second user with information relating to content presented to the first user;
    comparing the information relating to content presented to the second user with information relating to content presented to the first user, and
    in response to comparing the information, causing information to be provided to the first user regarding whether the first and second users are viewing different portions of the same content, viewing different versions of the same content or viewing content that deviates by no more than a predefined amount.

2. A method according to claim 1 wherein the information that is caused to be provided to the first user indicates whether the content presented to the second user is identical to the content presented to the first user.

3. A method according to claim 1 further comprising generating the representation of the content presented to the second user, wherein generating the representation comprises obscuring at least portions of the content presented to the second user.

4. A method according to claim 1 wherein causing the representation to be presented to the first user comprises causing the representation to be presented to the first user by the head mounted display of the first user such that the representation is presented at a location defined in relation to the second user.

5. A method according to claim 4 wherein causing the representation to be presented to the first user further comprises causing the representation to be presented to the first user by the head mounted display of the first user such that the representation appears to be superimposed upon at least one of the second user or an object associated with the second user.

6. A method according to claim 4 wherein causing the representation to be presented to the first user further comprises causing the representation to be presented to the first user by the head mounted display of the first user such that the representation appears to be proximate to the second user.

7. An apparatus comprising at least one processor and at least one memory including computer program code, the at least one memory and the computer program code configured to, with the processor, cause the apparatus to at least:
    cause content to be presented to a first user by a head mounted display of the first user;
    receive information relating to content presented to a second user by a head mounted display of the second user;
    generate a representation of the content presented to the second user, wherein the representation of the content comprises an abstraction of the content presented to the second user, and wherein the abstraction of the content presented to the second user comprises a blurred representation of the content, a title of the content or one or more fields of the content;
    based upon the information, cause the representation of the content, including the content comprising the abstraction, that is presented to the second user to also be presented to the first user by the head mounted display of the first user so as to identify the content presented to the second user by the head mounted display of the second user but without displaying the content itself;
    cause a visual indicator to be presented to the first user by the head mounted display of the first user representative of a commonality of the information relating to content presented to the second user with information relating to content presented to the first user;
    compare the information relating to content presented to the second user with information relating to content presented to the first user, and
    in response to a comparison of the information, cause information to be provided to the first user regarding whether the first and second users are viewing different portions of the same content, viewing different versions of the same content or viewing content that deviates by no more than a predefined amount.

8. An apparatus according to claim 7 wherein the information that is caused to be provided to the first user indicates whether the content presented to the second user is identical to the content presented to the first user.

9. An apparatus according to claim 7 wherein the at least one memory and the computer program code are further configured to, with the processor, cause the apparatus to generate the representation of the content presented to the second user, wherein the at least one memory and the computer program code are configured to, with the processor, cause the apparatus to generate the representation by obscuring at least portions of the content presented to the second user.

10. A computer program product comprising at least one non-transitory computer-readable storage medium having computer-executable program code portions stored therein, the computer-executable program code portions comprising program code instructions for:
    causing content to be presented to a first user by a head mounted display of the first user;
    receiving information relating to content presented to a second user by a head mounted display of the second user;
    generating a representation of the content presented to the second user, wherein the representation of the content comprises an abstraction of the content presented to the second user, and wherein the abstraction of the content presented to the second user comprises a blurred representation of the content, a title of the content or one or more fields of the content;

based upon the information, causing the representation of the content, including the content comprising the abstraction, that is presented to the second user to also be presented to the first user by the head mounted display of the first user so as to identify the content presented to the second user by the head mounted display of the second user but without displaying the content itself;

causing a visual indicator to be presented to the first user by the head mounted display of the first user representative of a commonality of the information relating to content presented to the second user with information relating to content presented to the first user;

comparing the information relating to content presented to the second user with information relating to content presented to the first user, and in response to comparing the information, causing information to be provided to the first user regarding whether the first and second users are viewing different portions of the same content, viewing different versions of the same content or viewing content that deviates by no more than a predefined amount.

11. A computer program product according to claim 10 wherein the information that is caused to be provided to the first user indicates whether the content presented to the second user is identical to the content presented to the first user.

12. A computer program product according to claim 10 wherein the program code instructions for generating the representation comprise program code instructions for obscuring at least portions of the content presented to the second user.

* * * * *